United States Patent [19]
Yamamoto

[11] Patent Number: 5,760,762
[45] Date of Patent: Jun. 2, 1998

[54] COLOR IMAGE PROCESSING METHOD AND COLOR IMAGE PROCESSING

[75] Inventor: Kunihiro Yamamoto, Tokyo, Japan

[73] Assignee: Canon Kabushiki Kaisha, Tokyo, Japan

[21] Appl. No.: 902,943

[22] Filed: Jul. 30, 1997

Related U.S. Application Data

[63] Continuation of Ser. No. 348,065, Nov. 23, 1994, abandoned.

[30] Foreign Application Priority Data

Nov. 25, 1993 [JP] Japan ................................. 5-295372
Nov. 21, 1994 [JP] Japan ................................. 6-286617

[51] Int. Cl.⁶ ................................................. G09G 5/04
[52] U.S. Cl. ...................................... 345/154; 345/153
[58] Field of Search .................................. 345/112, 150, 345/153, 154, 155; 358/518; 348/660

[56] References Cited

U.S. PATENT DOCUMENTS 5,124,688  6/1992  Rumball .................... 345/154
5,506,604  4/1996  Nally et al. ................ 345/153

Primary Examiner—Regina Liang
Attorney, Agent, or Firm—Fitzpatrick, Cella, Harper & Scinto

[57] ABSTRACT

Color image information of a predetermined number of frames is inputted while being displayed by a brilliance component, and after completion of inputting of the predetermined number of frames, the color image information is converted to a color space of an output unit for display. A monochromatic image display is conducted during image input, and is converted to the color space of the output unit after completion of the image input so that the color image display is subsequently conducted without reducing the number of frames per unit time.

18 Claims, 8 Drawing Sheets

COLOR IMAGE PROCESSING METHOD AND COLOR IMAGE PROCESSING

This application is a continuation of application Ser. No. 08/348,065 filed Nov. 23, 1994, now abandoned.

BACKGROUND OF THE INVENTION

1. Field of the Invention

The present invention relates to color image processing apparatus and color image processing method.

2. Related Background Art

In the past, an expensive dedicated equipment has been required to convert a video signal such as an NTSC signal, to a digital signal to allow editing and processing in a computer. However, as a performance of the general purpose computer has improved, the editing and processing of image data are frequently performed by a CPU of the computer by using software, while providing an interface to read in the video signal to the general purpose computer.

An RGB color space is frequently used for the color display of the general purpose computer, and an NTSC composite signal is usually used in the transmission of the video using a YUV color space. Accordingly, an image read through an inexpensive video interface is YUV color space data and which needs to be converted from YUV color space data to RGB color space data in order to display the data on a display. However, when the conversion is performed by software without using the expensive dedicated color conversion equipment, a heavy load is placed on the CPU, and hence it is difficult to conduct the color conversion in parallel with read-in of the image data for display it on the display. Accordingly, it is not possible to display the image while the data is read and a quasi-animation image having a reduced number of frames per unit time is displayed.

SUMMARY OF THE INVENTION

It is an object of the present invention to provide a color image processing apparatus and color image processing method which permits the concurrent reading and display of an animation image.

It is another object of the present invention to provide color image processing apparatus and color image processing method which permits the reading of an animation image without reducing the number of frames per unit time.

In order to achieve the above objects, in accordance with one aspect of the present invention, there is provided a color image processing apparatus including: display means for displaying a brilliance component of color image information; memory means for storing the color image information; and conversion means for converting the color image information stored in the memory means to color image information of a color space color-displayable by the display means.

It is other object of the present invention to provide a color image processing apparatus and color image processing method which permits the display without reducing the number of frames while reading the color animation image and also permits editing and processing of the color image.

It is a further object of the present invention to provide a color image processing apparatus and color image processing method having a novel function.

Other objects and features of the present invention are apparent from the following detailed description and the accompanying drawings.

DETAILED DESCRIPTION OF THE PREFERRED EMBODIMENTS

Figure 1:
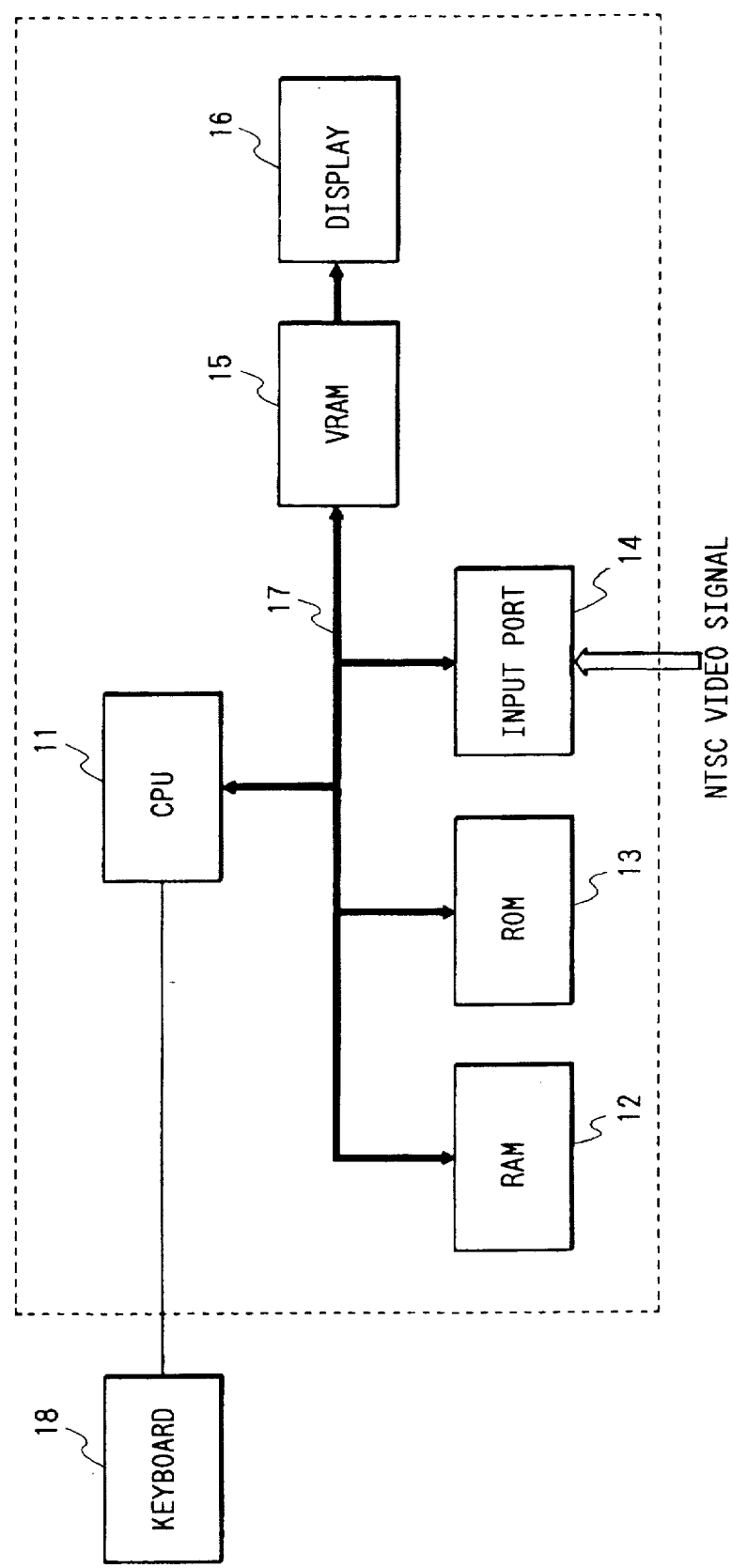
FIG. 1 is a configuration of an animation image editing system in the first embodiment of the present invention.

One embodiment of the present invention is now described in detail with reference to the drawings. FIG. 1 is a configuration of a color animation image processing system of the embodiment. Elements thereof are described in sequence.

[First Embodiment]

The color animation processing system comprises a CPU 11, a RAM 12, a ROM 13, an input port 14, a VRAM 15, a display 16, a bus 17 and a keyboard 18. The CPU 11, the RAM 12, the ROM 13, the input port 14 and the VRAM 15 are interconnected by the bus 17. The input port 14 reads and converts an external NTSC video signal to digital color animation data. The digital color animation image data inputted through the input port 14 is temporarily stored in the RAM 12 (which has a capacity corresponding to at least the number of input frames of the color animation image data so that the CPU 11 can read a pixel value of any coordinate of any frame of the animation image data by accessing a desired address of the RAM 12. An image processing program (software) for the present embodiment is stored in the ROM 13. The VRAM 15 comprises a plurality of frame memories and has a depth of 24 bits per pixel. It stores R, G and B data as 8-bit quantized image data and the display 16 displays the image in accordance with the pixel value.

In addition, RAM 12 may be used as a work space memory for the CPU 11.

Figure 2:
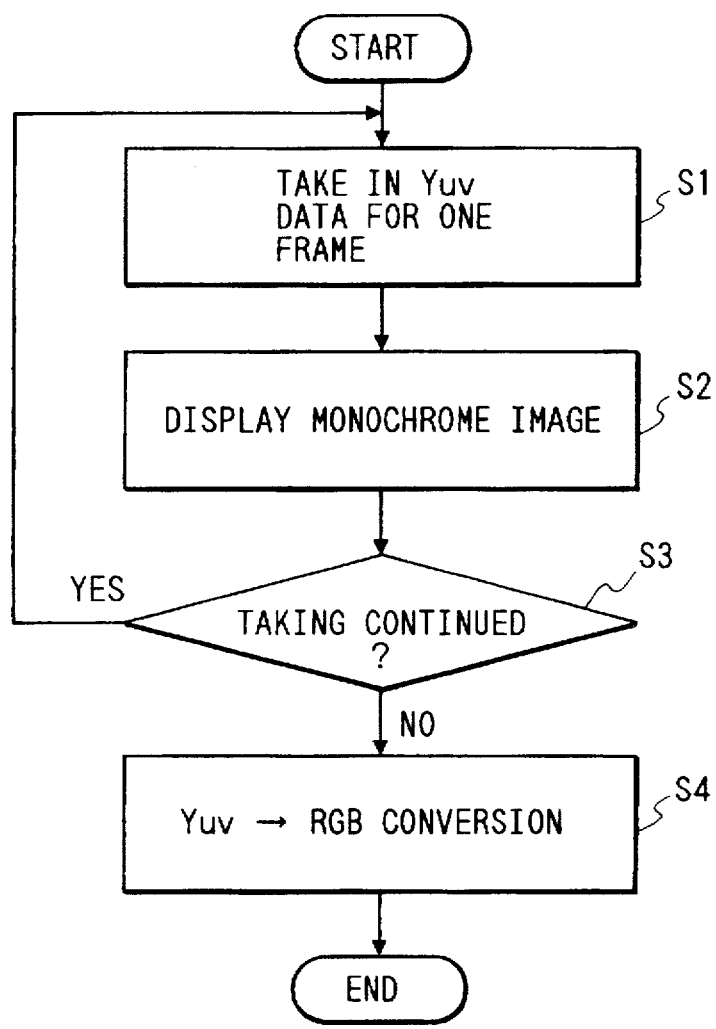
FIG. 2 is a flow chart of an animation image reading method in the first embodiment.

FIG. 2 shows a method for reading in the animation image in the present embodiment. The following process is controlled by the CPU 11 by a command from the keyboard 18.

In step S1, one frame of a video signal is quantized in the YUV space through the input port 14, and is read into a predetermined area of the RAM 12. In a step S2, Y component of the read image data in the RAM 12 is transferred to a predetermined area of the VRAM 15. Details of step S2 are described later. In step S3, whether the reading of the animation image data is to be continued or not is determined, and if it is to be continued, the process returns to the step S1. Otherwise, the process proceeds to step S4. The determination in step S3 depends on whether the number of read frames has reached a predetermined number of frames, or whether a user has commanded to discontinue the reading by manipulating the keyboard.

The YUV animation image data read in step S4 is converted to RGB animation image data and the animation image data read routine is terminated. Details of step S4 are described later.

As described above, in the present embodiment, the color conversion is not conducted concurrently with the reading of the image but the display by the monochromatic image or the Y (brilliance component) which imparts a relatively low processing load is conducted. When the reading of the image and the color conversion from the YUV color space to the RGB color space are to be executed in real time by the software controlled by the CPU, it may be possible that the required load cannot be appropriately processed, although it depends on the performance of the CPU 11 and the bus 17. In such a case, the number of displayed frames per unit time must be reduced. On the other hand, when the monochromatic display is to be executed, the display may be conducted by using Y of the YUV color space signals and the display by the monitor follows the real time reading. Thus, the color image conversion is executed after the reading without reducing the number of frames and the image stored in the RAM 12 is monitored by the monitor although it is monochromatic, and the editing and is processing can be conducted in color.

(Explanation of Step S2)

In the present embodiment, the VRAM 15 has a size of W pixels in the main scam direction and H pixels in the sub-scan direction, and one bit has 24-bit depth. The CPU 11 is mapped in the form of a two-dimensional memory array and the data in the VRAM 15 corresponding to the pixel position is accessed as data $V_{ij}$ (where $0 \leq i \leq W$ and $0 \leq j \leq H$). Brilliance at a point in the image displayed on the display 16 is determined by the value of corresponding $V_{ij}$. Specifically, the brilliance of a desired pixel position of the display 16 is displayed by conducting an operation of $$V_{ij} \leftarrow (R_{ij} << 16) + (G_{ij} << 8) + B_{ij}$$

where $R_{ij}$, $G_{ij}$ and $B_{ij}$ are 8-bit quantized values of the brilliance of the R, G and B components of the pixel position (i, j). "<<" represents a shift operator, and "<<16" represents 16 bits shift left, that is, a multiplication of $2^{16}$.

It is assumed that the image data read into the RAM 12 in the step S1 has a size of W1 pixels in the main scan direction and H1 pixels in the sub-scan direction. Assuming that the Y, U and V components of the image data corresponding to the pixel position (l, m) of the k-th frame are $Y_{k,l,m}$, $U_{k,l,m}$ and $V_{k,l,m}$ (where $0 \leq l \leq W1$ and $0 \leq m < H1$), and the access is made from the CPU 11.

Figure 4:
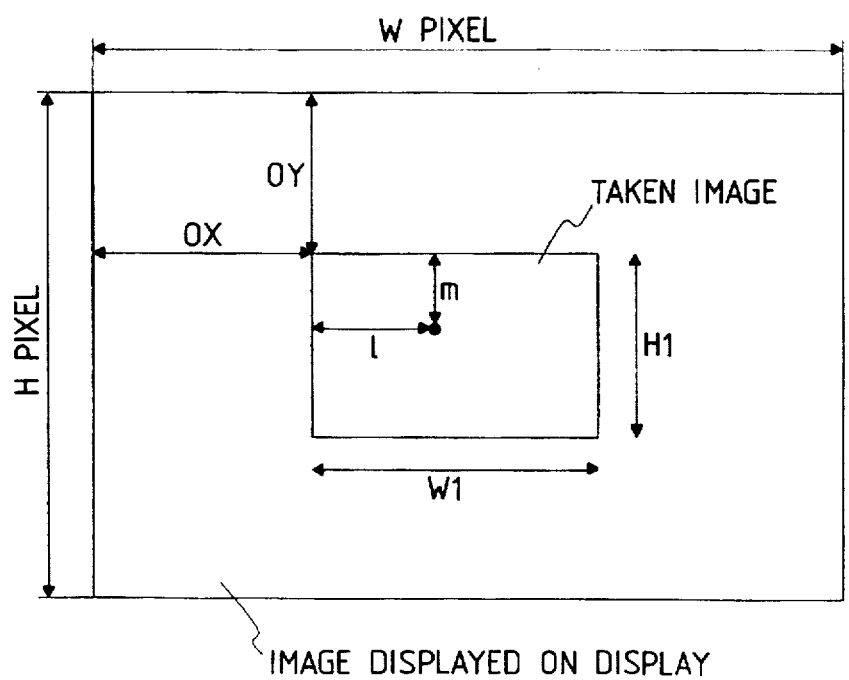
FIG. 4 shows positions of an image displayed on the display and a read image.
Figure 5:
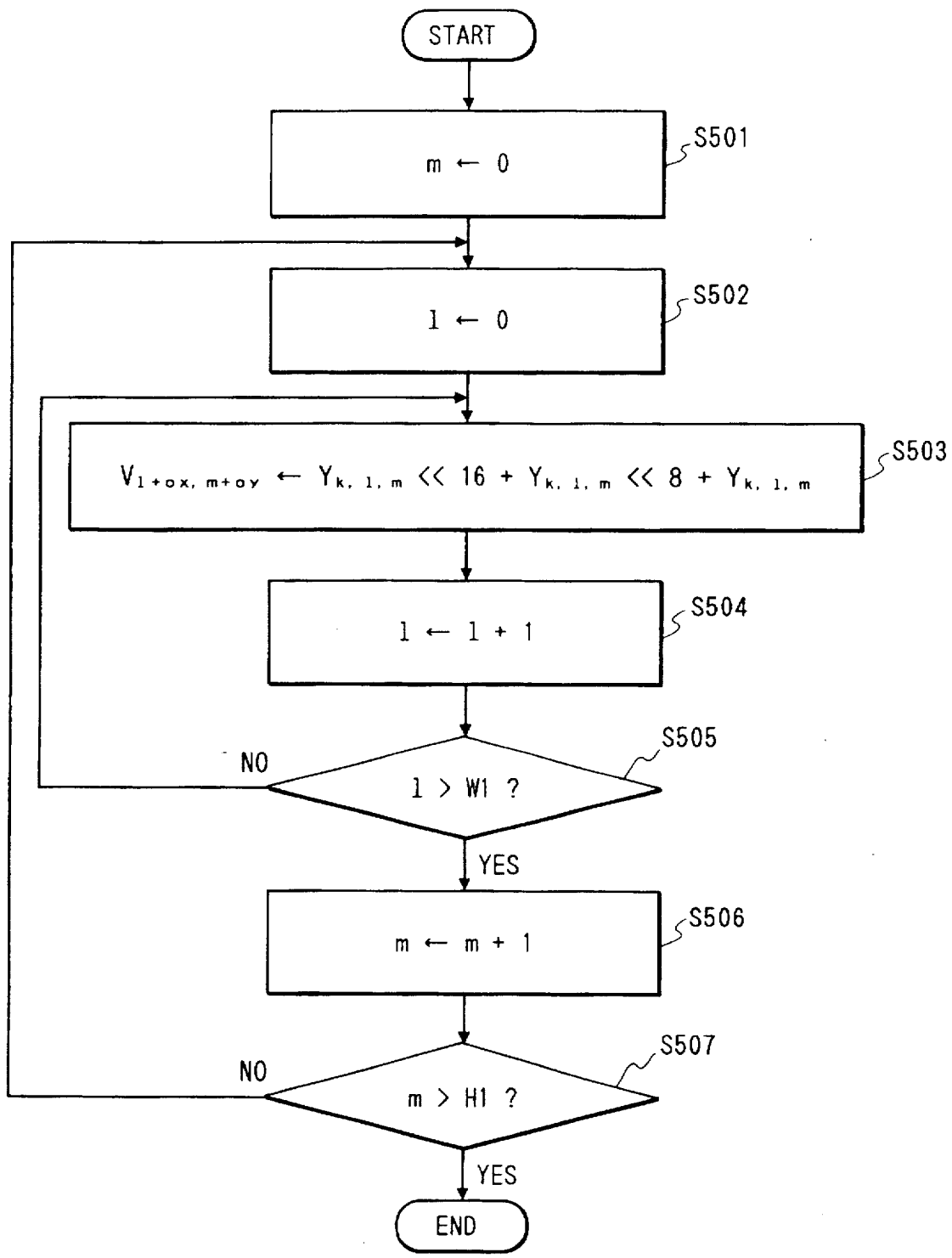
FIG. 5 is a flow chart showing details of step S2 in FIG. 2.

Referring to FIG. 5, a flow chart of a process to display the image of an size of W1 pixels×H1 pixels read from the video signal such that a pixel position (0X, 0Y) on the display is at the left top corner as shown in FIG. 4 is described.

In steps S501 and S502, variables l and m which are used as a loop counter are set to 0. In step S503, data $V_{l+0X, m+0Y}$ corresponding to the pixel position l+0X, m+0Y of the display is updated. For the monochrome image display, the same values may be set for the R, G and B components so that the value of $Y_{k,l,m}$ is set to the R, G and B fields. Namely, the operation of $$V_{l+0X,m+0Y} \leftarrow (Y_{k,l,m} << 16) + (Y_{k,l,m} << 8) + Y_{k,l,m}$$

is conducted (where "<<" is a shift operator).

In step S504, a value of l is increased by one. That is, the position is a target pixel is moved by one pixel in a main scanning direction.

In step S505, l is compared with W1, and if l is larger than W1, the process proceeds to step S506. Otherwise, the process returns to step S503.

In step S506, the value m is incremented by one. Namely, the pixel under consideration is advanced by one step in the sub-scan direction.

In step S507, m is compared with H1 and if m is larger than H1, the process is terminated. Otherwise, the process returns to step S502. By this flow, the monochromatic YUV color space data read into the RAM 12 is monitored in real time.

(Explanation of Step S4)

Figure 6:
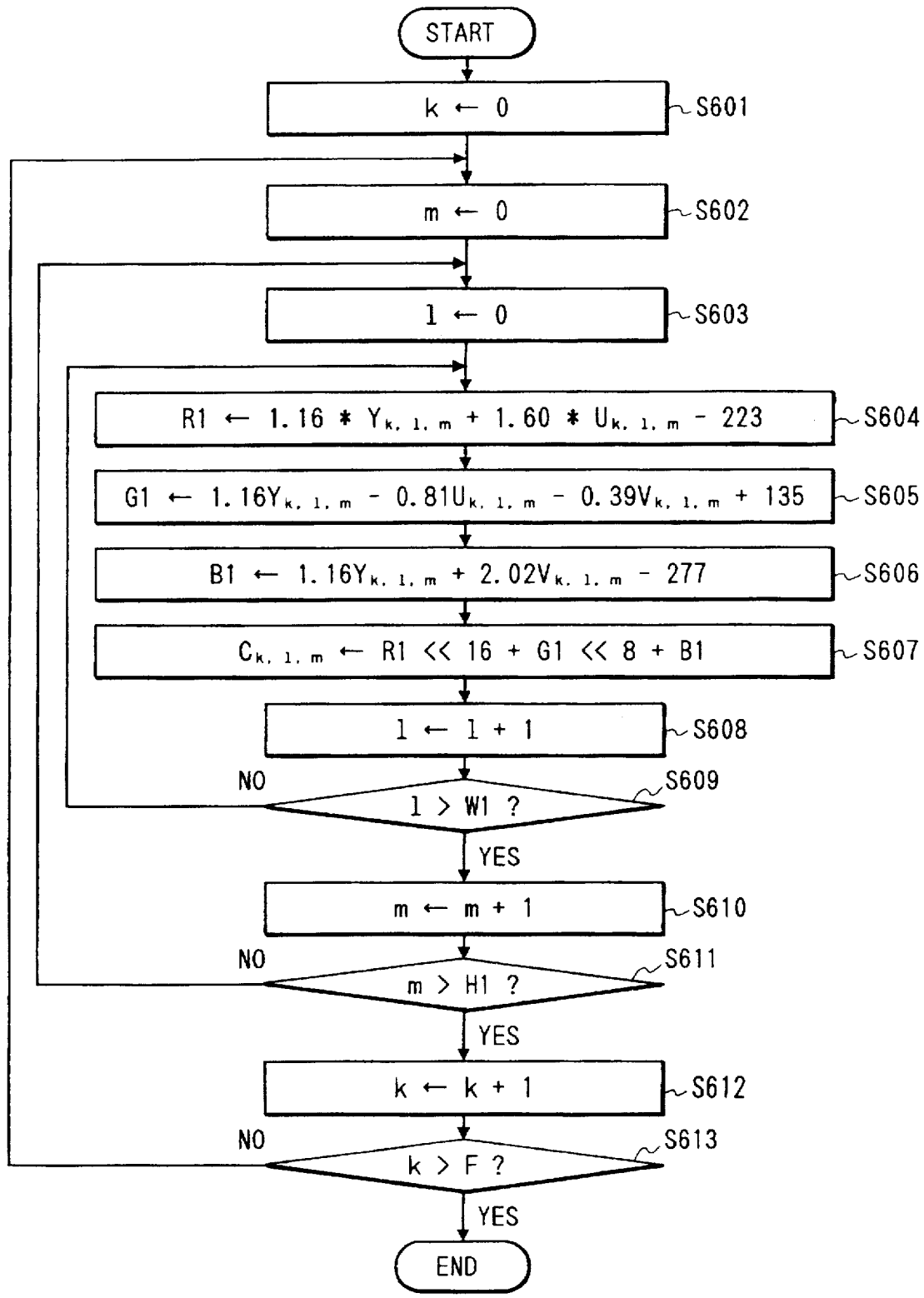
FIG. 6 is a flow chart showing details of step S4 in FIG. 2.

The image data $Y_{k,l,m}$, $U_{k,l,m}$ and $V_{k,l,m}$, read into the RAM 12 in step S1 and quantized in YUV space cannot be displayed in color as is, nor can the image data be edited or processed while viewed on the monitor. Accordingly, the image data is converted to the RGB space data. A flow of this process is shown in FIG. 6 and described below.

As described above, the read image has the size of W1 pixels in the main scan direction and H1 pixels in the sub-scan direction, and the Y, U and V data are separately quantized and stored in the memory. CPU 11 accesses the data corresponding to the pixel position (l, m) of the k-th frame in the RAM 12 as $Y_{k,l,m}$, $U_{k,l,m}$ and $V_{k,l,m}$.

The area in the VRAM 15 which stores the R, G and B data color-converted from the above data is accessed as $C_{k,l,m}$. C has 24-bit depth per pixel and the 24 bits are divided into three fields of consecutive 8 bits with the high order 8 bits representing the R component, the next 8 bits representing the G component and the low order 8 bits representing the B component.

It is assumed that a total of F frames of animation image data is read, where $0 \leq k < F$.

In steps S601, S602 and S603, k, l and m are set to 0 where k represents an index of the frame number, l represents a pixel position in the main scan direction of the pixel under consideration, and m represents a pixel position in the sub-scan direction.

In step S604, the R component is calculated based on the values of Y, U and V, and is set as a variable R1. Similarly, in steps S605 and S606, the G component and the B component are calculated and are set as variables G1 and B1, respectively. FIG. 6 is an example of a conversion formula, which may vary depending on a characteristic of quantization. While the conversion from the YUV space to the RGB space is shown, the input image of another color space such as La*b* color space can be converted to the RGB color space by merely replacing the conversion formulas of steps S604, S605 and S606.

In step S607, a 24-bit pixel value is calculated based on the values of R1, G1 and B1 and are set in $C_{k,l,m}$. Namely, an operation of $$C_{k,l,m} \leftarrow (R1 << 16) + (G1 << 8) + B1$$

is conducted for the pixel (l, m) of the k-th frame.

In step S608, the value of l is incremented by one. Namely, the pixel position under consideration is advanced by one step in the main scan direction.

In a step S609, l is compared with W1. If l>W1, the process returns to step S604. Otherwise, the process proceeds to a step S610.

In step S610, the value of m is incremented by one. That is, the pixel position under consideration is advanced by one step in the sub-scan direction.

In step S611, m is compared with H1. If m>H1, the process returns to step S603.

In step S612, k is incremented by one and in step S613, k is compared with F. If k>F, it means that all frames have completed the color conversion and the process goes to END to terminate the conversion process routine.

If $k \leq F$, the process returns to the step S602 to conduct the color conversion for the next frame.

After the above process, desired image editing or processing may be applied to the data converted to the RGB color space in accordance with a command from the keyboard 18 so that the externally received NTSC signal can be monitored in real time although it is monochromatic and then it is edited and processed in color.

The image editing and processing may include a general edit processing, such as the combination of the image stored in the RAM 12 as required, the reversal of the sequence of reading from the RAM 12 to form a mirror image, the change of the display position on the display 17 by reading desired pixels from the RAM 12 through the CPU 11, or the change of color by adding any value to the read data value.

While the VRAM 15 is shown to have a 24-bit depth, the present invention is not limited thereto and other configurations may be used. For example, data of 8-bit per pixel which is common in the general purpose computer may be used and the color information may be displayed through a look-up table. In this case, it is necessary to convert the RGB 24-bit data (approximately 16700K colors) to an image which can represent with 8 bits (256 colors) at most. To this end, a dither method or an error spread method may be used. Since those methods are known in the art, the explanation thereof is omitted.

When the capacity of the VRAM 15 is saved, the processing load increased by the necessity of processing such as the dither process. However, it is not necessary to reduce the number of frames per unit time in the read process even if the load on the CPU increases by not conducting the color space conversion process (YUV→RGB and RGB→limited colors) in parallel with the image reading, and instead displaying the image by Y (brilliance) during the reading to permit the monitoring and conducting the color converting after the reading, which is a feature in the present embodiment.

In the present embodiment, the VRAM 15 is a multi-page memory and is used as the monochromatic image display memory in step S2 of FIG. 2 and the data memory after the YUV→RGB conversion in step S4. Alternatively, a memory of a small capacity such as an 8-bit per pixel memory may be used as the memory for the monochromatic image display, that is, for the real time display and a 24-bit memory such as that shown in the embodiment may be used as the RGB color memory, and the memories may be selectively used for the real time display and for the data memory after the color conversion.

[Second Embodiment]

In the above-mentioned first embodiment, while the NTSC video signal is read in through the input port 14, color space conversion is not concurrently conducted, but the display is performed by the monochromatic image or the Y (brilliance component) which imparts a low processing load to the CPU 11. After all the frames of video signals are read in, the color conversion to the RGB color space is executed in order to view them on the monitor. Accordingly, the read NTSC video signals are displayed and viewed as a monochromatic image, without reducing the number of displayed frames per unit time. In addition, after the color conversion to the RGB color space, the editing and processing of the read images is conducted in color.

In the second embodiment, however, while the NTSC video signal is read in, sub-sampling is conducted, in which one pixel per a certain number of, for example four, pixels is picked up both in the main scan direction and the sub-scan direction of the image. The conversion of only thus picked-up pixels is conducted in the RGB color space in order to display them in color on the monitor. After all the frames of images are read in, all the read frames of the NTSC video signals are converted to the RGB color space. Accordingly, the full-size editing and processing in color is conducted by the image processing apparatus according to this second embodiment.

The second embodiment of the present invention is further described below with reference to the drawings.

Figure 7:
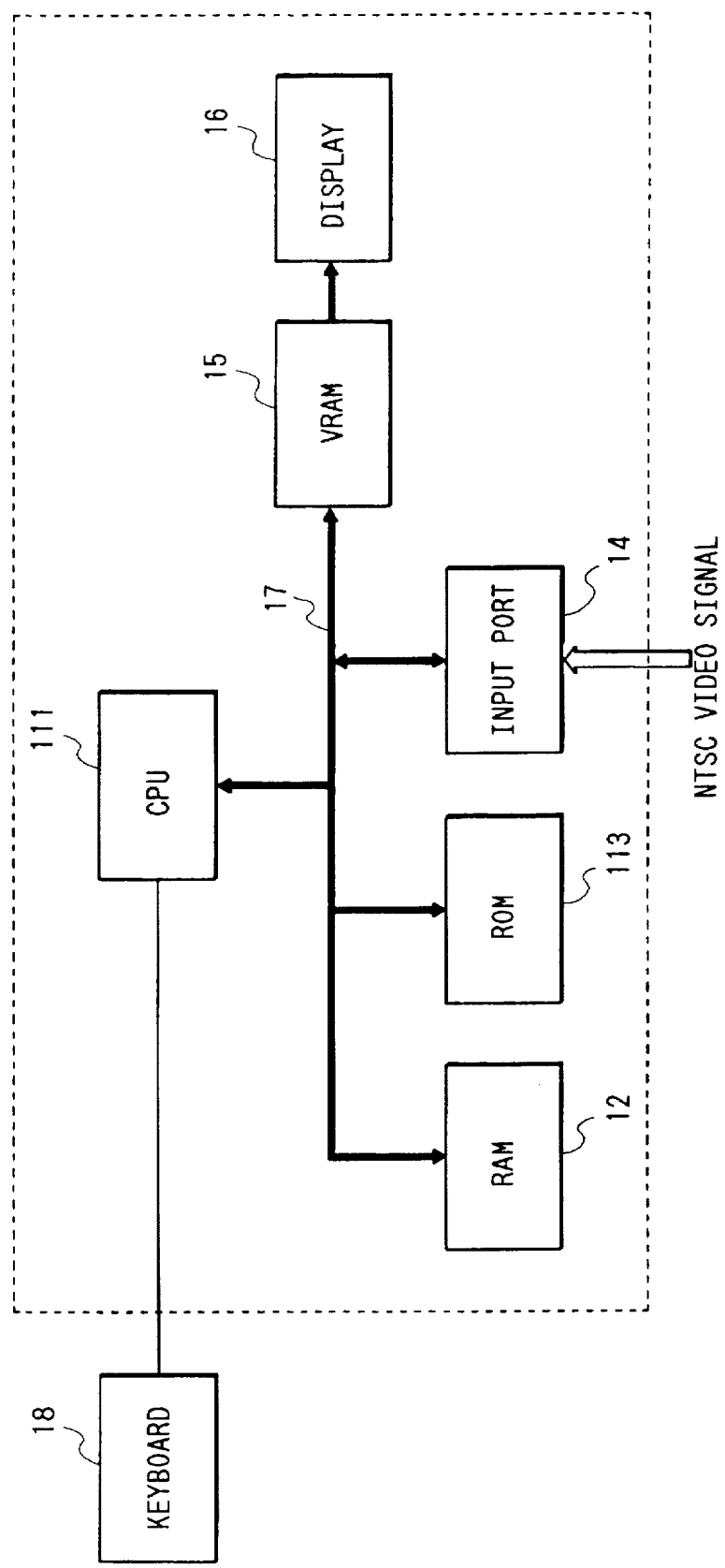
FIG. 7 is a configuration of an animation image editing system in the second embodiment of the present invention.

FIG. 7 is a configuration of the animation image editing system of the second embodiment according to the present invention.

The animation image editing system of this embodiment is different from that of the first embodiment in that the image processing program ROM 113 of the CPU 111 is programmed so that the reduced color image consisting of only the pixels (sub-)sampled from all the NTSC video signals to read in is displayed on the display 116 in real time during the reading of the NTSC video signals into the system. The rest of the configuration is the same as that shown in FIG. 1, so the detailed description thereof is omitted.

Figure 8:
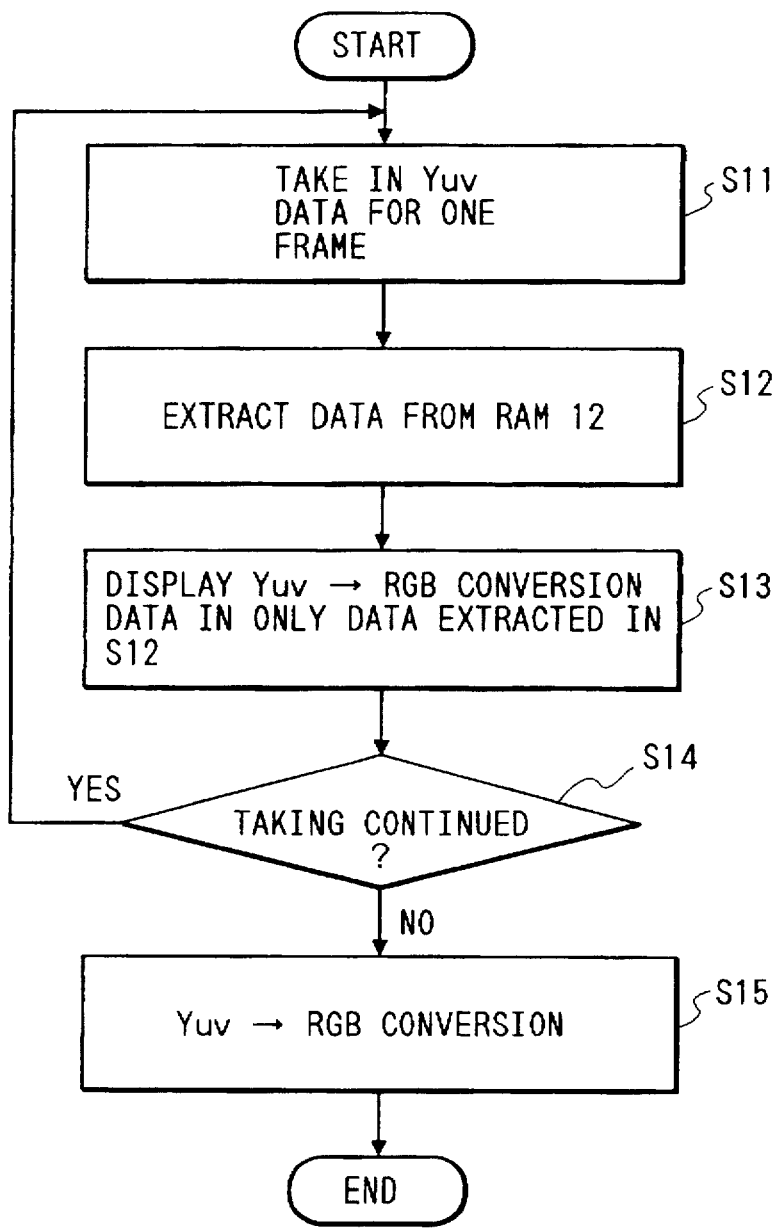
FIG. 8 is a flow chart of an animation image reading method in the second embodiment.

Now, the method of reading the NTSC video signals according to this embodiment is described with reference to FIG. 8.

First, in step S11, one frame of NTSC video signal is quantized in the YUV space through the input port 14, and is read into a predetermined area in the RAM 12.

In step S12, a Y component, a U component and a V component of the read image data in the RAM 12 are sub-sampled per a certain number of pixels (per four pixels in this embodiment) according to a command from the CPU 111. In step S13, the bits of the data picked up according to the CPU 111 are converted from the YUV color space to the RGB color space, and the converted data is transferred to a predetermined area in the VRAM 15 and displayed on the display 16. Next, in step S142, whether the reading of the NTSC data is to be continued or not is determined, and if it is to be continued, the process returns to step S11. Otherwise, the process proceeds to step S15. The determination in step S14 depends on whether the number of read frames has reached a predetermined number of frames, or whether a user has commanded to discontinue the reading by manipulating the keyboard.

The full-scale color space conversion of the data read in step S15 is conducted by the CPU 111, when the data is converted from the YUV space to the RGB space. Thus the animation image data read routine is terminated.

(Explanation of Step S13)

In the present embodiment, like the first embodiment, the size of the image data in the YUV space read in the RAM 12 in step S11 is W1 pixels×H1 pixels.

The Y, U and V components of the image data corresponding to the pixel position (l, m) of the k-th frame in the RAM 12 are accessed as data $Y_{k,l,m}$, $Uk_{k,l,m}$ and $V_{k,l,m}$ from the CPU 111.

Like the first embodiment, the VRAM 15 has a size of W pixels in the main scan direction and H pixels in the sub-scan direction, and one bit has 24-bit depth.

Figure 3:
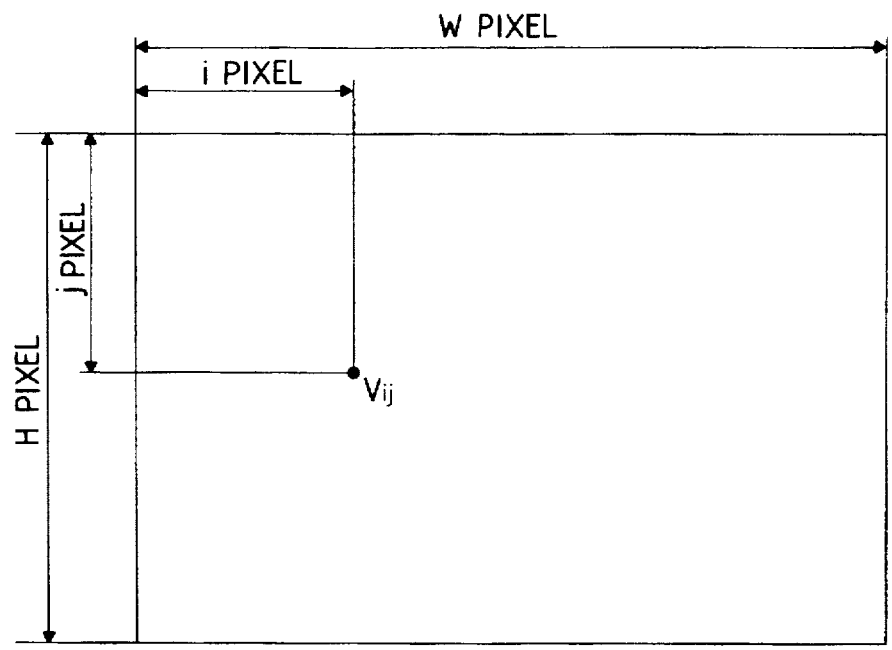
FIG. 3 shows coordinates of an image displayed on a display.
Figure 9:
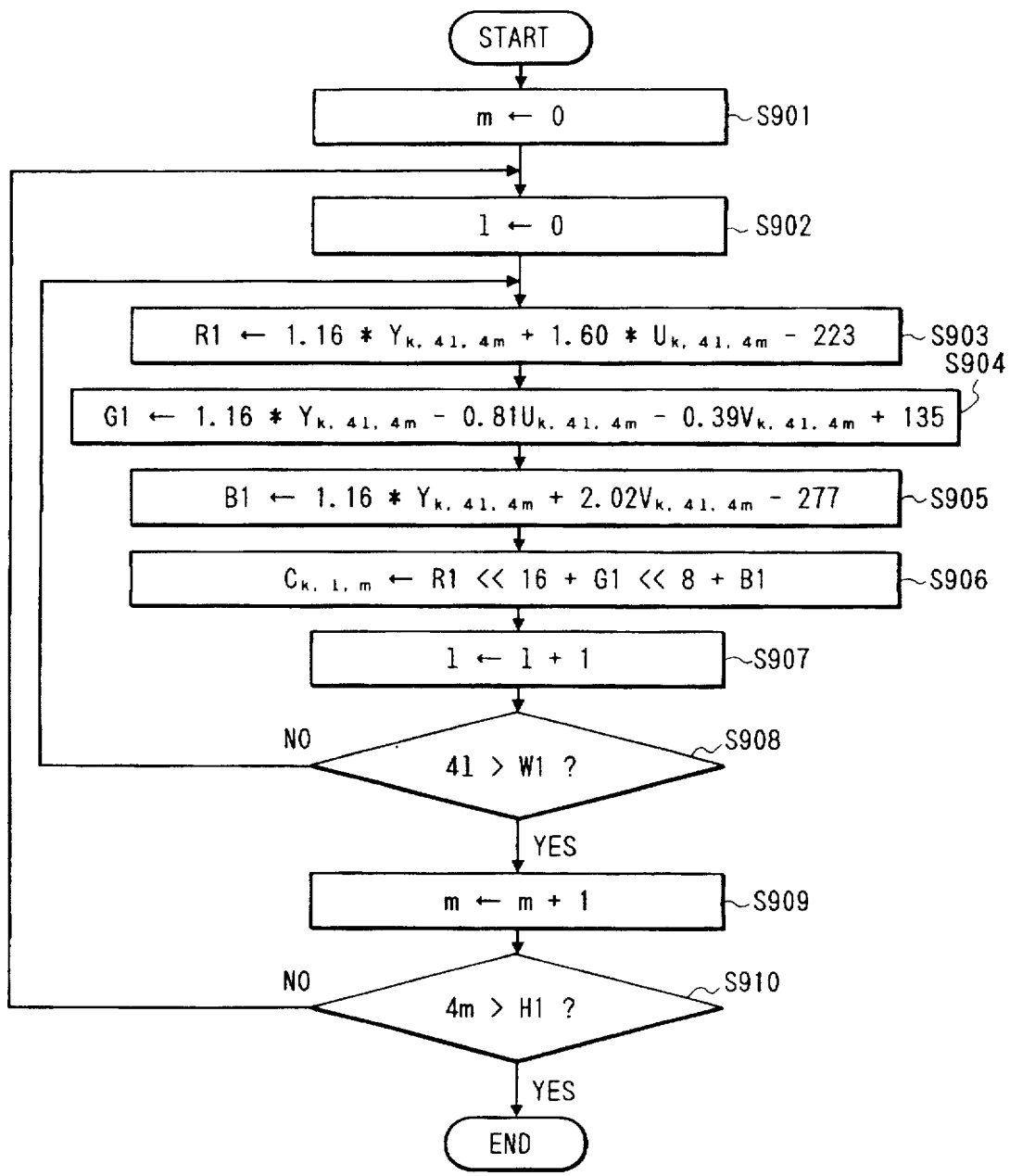
FIG. 9 is a flow chart showing details of step S13 in FIG. 8.

The CPU 111 is mapped in the form of a two-dimensional memory array and, like the first embodiment shown in FIG. 3, the data in on the VRAM 15 corresponding to the pixel position (i, j) is accessed as a value $C_{l,m}$. FIG. 9 is a flow chart of the image data extraction process, in which image data having a size of ca ¼ of the original data both in the main scan direction and the sub-scan direction is extracted from the image data which has been read in the RAM 12 and has a size of W1 pixels×H1 pixels.

First in steps S901 and S902, variables l and m are set to 0 which are used as a loop counter.

In the following steps S903 to S905, in order to execute a color display on the display 16, the data stored in the RAM 12 as the data in the YUV space is converted to the RGB space. The CPU 111 accesses one pixel from every four pixels. 0, 4, . . . , in the main scan direction as well as one line from every four lines in the sub-scan direction in the RAM 12.

In step S906, the value $C_{l,m}$ is calculated based on the values R1, G1 and B1 obtained by the CPU 111 in order to display $C_{l,m}$ as the data of the coordinates (l, m) in the VRAM 15.

In step S907, the value of 1 is incremented by one. Namely, the pixel position under consideration is advanced by four steps in the main scan direction.

In step S908, $4i$ is compared with W1. If $4l>W1$, the process proceeds to step S909. Otherwise the process returns to step S903.

Then, in step S909, the value m is incremented by one. Namely, the pixel position under consideration is advanced by one line in the sub-scan direction.

In step S910, $4m$ is compared with H1. If $4m>H1$, the process is terminated. Otherwise, the process returns to step S902.

By this flow, the data in the YUV space read in the RAM 12, though having an image size of $\frac{1}{16}$, is displayed in color in the display 16 on real time with the reading of the image data.

It is easily understood that the data is displayed at desired positions on the display 16 in the same way as that of the first embodiment.

Though, in this embodiment, the displayed data has ca ¼ dimensions in the main scan direction and the sub-scan direction, that is, an area size of $\frac{1}{16}$ of that of the image stored in the RAM 12, the present embodiment allows the displayed data to have various sizes as long as the display speed follows the real time reading of the data through the input port 14.

In accordance with the embodiment of the present invention, the color display is not conducted, and instead the brilliance display is conducted during the reading of the color animation image, and the color space conversion to allow the color display is conducted after the input of the color animation image so that the animation image can be inputted while it is displayed without reducing the number of frames per unit time.

The present invention is not limited to the specific embodiments, and various modifications may be made without departing from the spirit and scope of the present invention.

What is claimed is:

1. A color image processing apparatus comprising:
    input means for inputting a color image composed of plural components;
    conversion means for converting the plural components into data for display on a predetermined display, by a software processing using a predetermined program;
    first control means for controlling to supply data to said conversion means, in which a data amount of at least one of the plural components is reduced, to display on the predetermined display the image having the reduced data amount of at least one of the plural components;
    memory means for storing the plural components corresponding to the color image input by said inputting means; and
    second control means for controlling to supply the plural components stored by said memory means to said conversion means and to display the color image on said predetermined display on the basis of the data obtained by said conversion means,
    wherein said second control means enables said predetermined display to display a same image as the image displayed on said predetermined display by the controlling of said first control means.

2. An apparatus according to claim 1, wherein the control by which the color image is displayed on said predetermined display by said first control means is performed in parallel with the storage of the color image by said memory means.

3. An apparatus according to claim 1, wherein the control by which the color image is displayed on said predetermined display by said first control means is performed in real time in response to the input of the color image by said inputting means.

4. An apparatus according to claim 1, further comprising storing means for storing the predetermined program.

5. An apparatus according to claim 1, wherein data of a predetermined one of the plural components is not used in the reduction of the data amount of at least one of the plural components.

6. An apparatus according to claim 1, wherein data of each of the plural components is thinned in the reduction of the data amount of at least one of the plural components.

7. An apparatus according to claim 6, wherein data of each of the plural components is thinned to one fourth in the reduction of the data amount of at least one of the plural components.

8. A color image processing method comprising the step of:
    inputting a color image composed of plural components;
    converting the plural components into data for display on a predetermined display by a software processing using a predetermined program;
    a first controlling to supply data to said converting step, in which a data amount of at least one of the plural components is reduced, to display on the predetermined display the image having the reduced data amount of at least one of the plural components;
    storing the plural components corresponding to the color image input in said inputting step; and
    a second controlling to supply the plural components stored in said storing step to said converting step and to display the color image on said predetermined display on the basis of the data obtained in said converting step,
    wherein said second controlling step enables said predetermined display to display a same image as the image displayed on said predetermined display by the control in said first controlling step.

9. A color image processing apparatus comprising:
    input means for inputting a color image represented by a brilliance component and a hue component;
    conversion means for converting the brilliance component and the hue component into a color component for display on a predetermined display by a software processing using a predetermined program;
    first control means for controlling to display the color image as a monochromatic image on said predetermined display using the brilliance component;
    memory means for storing the brilliance component and the hue component corresponding the color image input by said inputting means; and
    second control means for controlling to display the color image as a color image on said predetermined display on the basis of the color component obtained by the conversion means using the brilliance component and the hue component, wherein said second control means enables said predetermined display to display a same image as the color image displayed on said predetermined display by the controlling of said first control means.

10. An apparatus according to claim 9, wherein the control by which the color image is displayed on said predetermined display by said first control means is performed in parallel with the storage of the color image by said memory means.

11. An apparatus according to claim 9, wherein the control by which the color image is displayed on said predetermined display, by said first control means is performed in real time in response to the input of the color image by said inputting means.

12. An apparatus according to claim 9, further comprising storage means for storing the predetermined program.

13. A color image processing method comprising the steps of:

inputting a color image represented by a brilliance component and a hue component;

converting the brilliance component and the hue component into a color component for display on a predetermined display by a software processing using a predetermined program;

a first controlling to display the color image as a monochromatic image on said predetermined display using the brilliance component;

storing the brilliance component and the hue component corresponding to the color image input by said inputting means; and a second controlling to display on the basis of the color component obtained by said converting step the color image as a color image on said predetermined display using the brilliance component and the hue component, wherein said second controlling step enables said predetermined display to display a same image as the color image displayed on said predetermined display by the controlling in the first controlling step.

14. A color image processing apparatus comprising:

input means for inputting a color animation image of plural frames represented by using a brilliance component and a hue component;

conversion means for converting the brilliance component and the hue component into a color component for display on a predetermined display by a software processing using a predetermined program;

first control means for controlling to display the color animation image as a monochromatic animation image on said predetermined display using the brilliance component;

memory means for storing the brilliance component and the hue component corresponding to the color animation image input by said inputting means; and second control means for controlling to display the color animation image as a color animation image on said predetermined display on the basis of the color component obtained by the conversion means using the brilliance component and the hue component, wherein said second control means enables said predetermined display to display a same image as the color animation image displayed on said predetermined display by the controlling of said first control means.

15. An apparatus according to claim 14, wherein the control by which the color animation image is displayed on said predetermined display, by said first control means is preformed in parallel with the storage of the color animation image by said memory means.

16. An apparatus according to claim 14, wherein the control by which the color animation image is displayed on said predetermined display, by said first control means is performed in real time in response to the input of the color animation image by said inputting means.

17. An apparatus according to claim 14, further comprising storing means for storing said predetermined program.

18. A color image processing method comprising the steps of:

inputting a color animation image of plural frames represented by using a brilliance component and a hue component;

converting the brilliance component and the hue component into a color component for display on a predetermined display by a software processing using a predetermined program;

a first controlling to display the color animation image as a monochromatic animation image on said predetermined display using the brilliance component;

storing the brilliance component and the hue component corresponding to the color animation image input in said inputting step;

a second controlling to display the color animation image as a color animation image on said predetermined display on the basis of the color component obtained by said converting step using the brilliance component and the hue component, wherein said second controlling step enables said predetermined display to display a same image as the color animation image displayed on said predetermined display by the control in said first controlling step.

* * * * *

UNITED STATES PATENT AND TRADEMARK OFFICE
CERTIFICATE OF CORRECTION

PATENT NO. : 5,760,762

DATED : June 2, 1998

INVENTOR(S): KUNIHIRO YAMAMOTO

It is certified that error appears in the above-identified patent and that said Letters Patent is hereby corrected as shown below:

COLUMN 1 line 12,   "signal" should read --signal,--;
    line 22,   "video" should read --video signal,--;
    line 30,   "it" should be deleted;
    line 37,   "permits" should read --permit--;
    line 41,   "permits" should read --permit--;
    line 53,   "other" should read --another--;
    line 55,   "permits" should read --permit--; and
    line 57,   "permits" should read --permit--.

COLUMN 2 line 37,   "data" should read --data)--; and
    line 53,   "a step S2, Y" should read --step S2, a Y--.

COLUMN 3 line 18,   "is processing can be" should read --processing is--;
    line 22,   "scam" should read --scan--;
    line 26,   "position" should read --position (i, j)--;
    line 45,   "the image of an" should read --an image of the--; and
    line 60,   "is a" should read --of a--.

UNITED STATES PATENT AND TRADEMARK OFFICE
CERTIFICATE OF CORRECTION

PATENT NO. : 5,760,762

DATED : June 2, 1998

INVENTOR(S) : KUNIHIRO YAMAMOTO

It is certified that error appears in the above-identified patent and that said Letters Patent is hereby corrected as shown below:

COLUMN 4 line 15,   "accesses the" should read --accesses--.

COLUMN 5 line 14,   "8-bit" should read --8 bits--;
   line 19,   "represent" should read --be represented--;
   line 24,   "increased" should read --is increased--; and
   line 58,   "is" should read --are--.

COLUMN 6 line 50,   "$Uk_{k,1,m}$" should read --$U_{k,1,m}$--; and
   line 65,   "ø which" should read --ø, which--.

COLUMN 7 line 13,   "4i" should read --41--; and
   line 24,   "on" should read --in--.

UNITED STATES PATENT AND TRADEMARK OFFICE
CERTIFICATE OF CORRECTION

PATENT NO. : 5,760,762
DATED      : June 2, 1998
INVENTOR(S): KUNIHIRO YAMAMOTO

It is certified that error appears in the above-identified patent and that said Letters Patent is hereby corrected as shown below:

COLUMN 8 line 62, "corresponding" should read --corresponding to--.

COLUMN 9 line 34, "on the basis of the color" should be deleted;
line 35, "component obtained by said converting step" should be deleted; and
line 36, "display" should read --display on the basis of the color component obtained by said converting step--.

Signed and Sealed this

Second Day of February, 1999

Attest:

Attesting Officer

Acting Commissioner of Patents and Trademarks